G. D. MATCHAM.
Sheep Stock.
No. 68,449.
Patented Sept. 3, 1867.
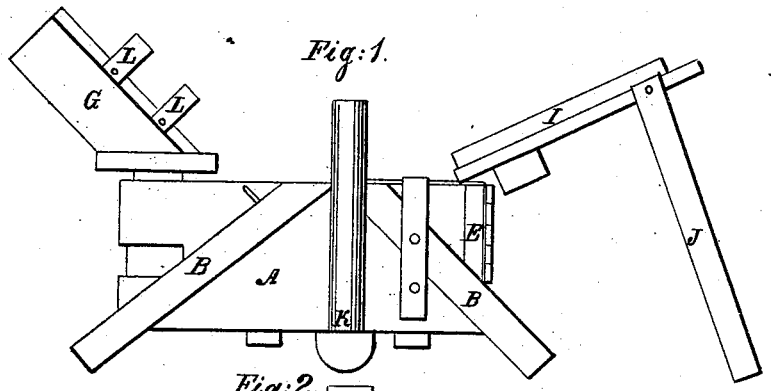
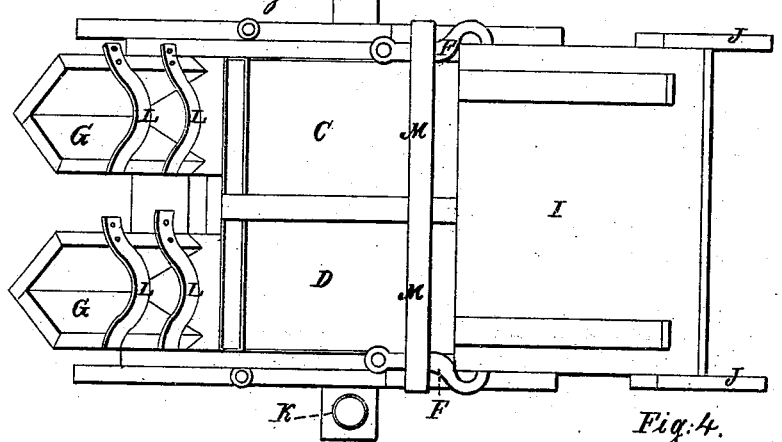
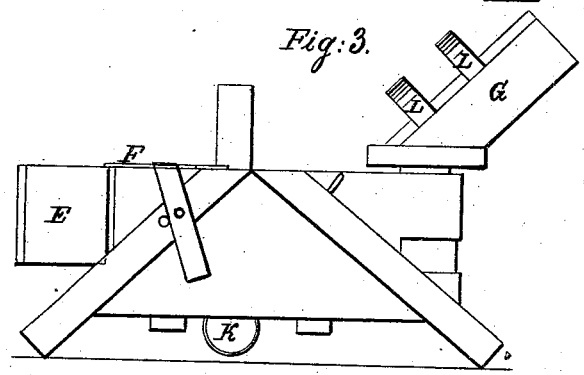
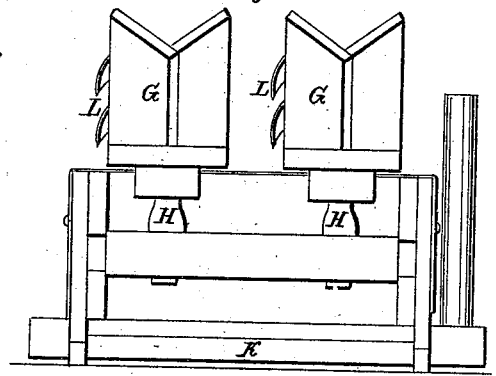
Witnesses:
J. H. Burridge
Frank S. Alden
Inventor.
George D. Matcham.

United States Patent Office.

GEORGE D. MATCHAM, OF PITTSFIELD, OHIO.

Letters Patent No. 68,449, dated September 3, 1867.

---

IMPROVEMENT IN SHEEP-CHAIR AND VAT.

---

*The Schedule referred to in these Letters Patent and making part of the same.*

---

TO ALL WHOM IT MAY CONCERN:

Be it known that I, G. D. MATCHAM, of Pittsfield, in the county of Lorain, and State of Ohio, have invented certain new and useful Improvements in a Sheep-Chair and Vat; and I do hereby declare that the following is a full and complete description of the same, reference being had to the accompanying drawings, making a part of this specification, in which—

Figure 1 is a side view of the apparatus.
Figure 2 is a view of the top.
Figure 3 is a view of the opposite side of fig. 1.
Figure 4 is an end view.
Like letters of reference refer to like parts in the several views.

A (fig. 1) represents the vat, the sides of which are constructed of wood, and the bottom of metal, and is supported upon the legs B, which also serve as braces to the structure. This vat is divided into two sections, C D, each provided with a door, E, (fig. 1,) and which is shown as being opened in fig. 3. F are the hooks by which the doors are held closed while the vat is being used. On one end of the vat are erected the chairs G, one to each section, and which are so connected to the vat by means of the pivots H, (fig. 4,) projected into the seat of the chair, as to allow of their being turned around in either direction, so as to bring the front of the chair facing the vat, or away from it, as circumstances may determine. I (fig. 2) is a table attached to one side of the vat, and supported by the legs J.

The practical use of this apparatus is for washing and dressing the feet of diseased sheep, and which is done in the following manner: The necessary acids, or liquid preparation for washing the feet is poured into the vat, which is then heated by means of the furnace K, arranged underneath. The sheep to be treated is placed in the chair, and secured therein by the straps L. The feet on being properly dressed, by paring or other manipulation, the animal is then loosened and dropped into the vat, and is prevented from escaping therefrom by the straps M drawn across the top. A rail or bar, N, (fig. 2) is also intruded across the end of the vat, thereby shortening the same according to the length and size of the sheep. The feet of the animal, on being sufficiently soaked by the heated liquid, it is then allowed to escape from the vat through the door E referred to. Should any further treatment of the animal be required, it is either again confined in the chair or laid upon the table, the inclination of the latter being such as to run all the drippings of the liquid back into the vat, which are thus saved.

The purpose of heating the liquid is that it may the more readily act upon the foot, and thus penetrate the wound and cleanse it more effectually than it could do on applying the preparation cold, which is the usual way of applying the liquid treatment, which, as ordinarily done, is by swabbing it upon the foot or driving the animal through it, which is a very wasteful and inefficient way, as the diseased foot requires to be soaked in and penetrated by the liquid in order to produce any desirable results.

This apparatus may consist of any number of sections and chairs, so that several persons can be engaged at the same time in treating a certain number of sheep, and thus expedite the treatment, the labor of which is very much reduced by the use of this apparatus.

What I claim as my improvement, and desire to secure by Letters Patent, is—

The adjustable chairs G, table I, and furnace K, in combination with the vat A, in the manner and for the purpose substantially as set forth.

GEORGE D. MATCHAM.

Witnesses:
J. H. BURRIDGE,
J. HOLMES.